Oct. 29, 1957 M. L. HASELTON ET AL 2,811,709

MULTIPLE-HEAD SCANNING DEVICE FOR MAGNETIC DISK RECORDS

Filed Jan. 12, 1954 2 Sheets-Sheet 1

INVENTORS:
MERTON L. HASELTON
GEORGE W. DENNIS

BY N. F. Presson
ATTORNEY

Oct. 29, 1957 M. L. HASELTON ET AL 2,811,709

MULTIPLE-HEAD SCANNING DEVICE FOR MAGNETIC DISK RECORDS

Filed Jan. 12, 1954 2 Sheets-Sheet 2

INVENTORS
MERTON L. HASELTON
GEORGE W. DENNIS
BY [signature]
ATTORNEY

United States Patent Office 2,811,709

Patented Oct. 29, 1957

2,811,709

MULTIPLE-HEAD SCANNING DEVICE FOR MAGNETIC DISK RECORDS

Merton L. Haselton, Rye, and George W. Dennis, Larchmont, N. Y., assignors to The Teleregister Corporation, New York, N. Y., a corporation of Delaware Application January 12, 1954, Serial No. 403,482

16 Claims. (Cl. 340—174)

This invention relates to scanning devices for use in association with magnetic record disks. It pertains to systems in which a magnetic record is rotated continuously and is scanned cyclically for the purpose of recording and playback of statistical items, such as are involved in computational work and the maintenance of an inventory, or the storage of transient data of any particular kind.

Heretofore it has been common practice to make such recordings and to obtain a playback of the same by means of recording heads, which are also used as playback heads, disposed in close proximity to the periphery of a magnetically coated drum. With that arrangement a scanning head for recording and playback would usually be fixedly mounted so as to scan a single circular track on the periphery of the drum. If the volume of statistical data to be recorded was great, then numerous tracks and scanning heads would be required, each head to serve the recording and playback requirements in respect to the data that might be assigned for storage on a single track.

Practical design considerations have imposed certain limitations on the axial length and diameter of a magnetic drum as used for data storage. Other limitations to the volume of statistical items which can be stored on a magnetic drum relate to the spacing between parallel recording tracks and to the so-called "packing factor," or spacing between adjacent "bits" of recordings along each track.

In an effort to expand the volume limits of a magnetic data storage medium applicants have conceived this invention as one which comprises a plurality of disks having surface coatings of magnetizable material and being mounted for continuous rotation on a common shaft. Spiral recording tracks on these disks are scanned by scanning heads held in scanning relation to the recording tracks. A mounting device is provided such that the heads can be moved jointly and to follow in scanning relation to their respective tracks, the heads being in alignment so that they may all follow their spiral tracks simultaneously. Two rows of heads may also be provided. Thus, if the traverse members on which the heads are mounted are caused to carry one row of heads inwardly toward the disk centers, the same motion of the traverse members will simultaneously carry the other row of heads outwardly, but during an interruption in their scanning function. So one row of heads will always be scanning while the other row is simply making a return stroke without following the scanning lines and without being electrically activated, as in performing the usual scanning operations.

A primary object of our invention is to provide a novel magnetic record scanning device of the general type indicated by the above brief description. More specific objects include the provision of mechanism having suitable gearing whereby the scanning strokes of the heads will be enabled to follow the spiral tracks of the disks and to return to the outer ends thereof within a fixed number of revolutions of the record disk axle.

Another of the specific objects of the invention relates to the provision of means for deriving synchronizing pulses from a rotating element which is mounted coaxially with the spiral recording disks and optionally employs a peripheral recording of dots on one of the disks, these synchronizing pulses being useful in timing the bit recordings or playbacks of the same irrespective of the particular portions of the spiral track where such recordings or playbacks are to be gated in and out.

Still another object of the invention is to obtain greater capacity of item storage on a continuously rotatable magnetic data storage medium than seems possible using the old techniques of data storage on the peripheries of cylindrical drums of commensurate space occupancy.

A single embodiment of our invention will now be shown and described, it being understood that the invention may be embodied in alternative forms within the scope of the claims. The following description will be supported and clarified by reference to the accompanying drawing wherein Fig. 1 shows a perspective view of our preferred disk scanning device, with parts of the view broken away to show certain elements that would otherwise be hidden;

Figures 1, 2:
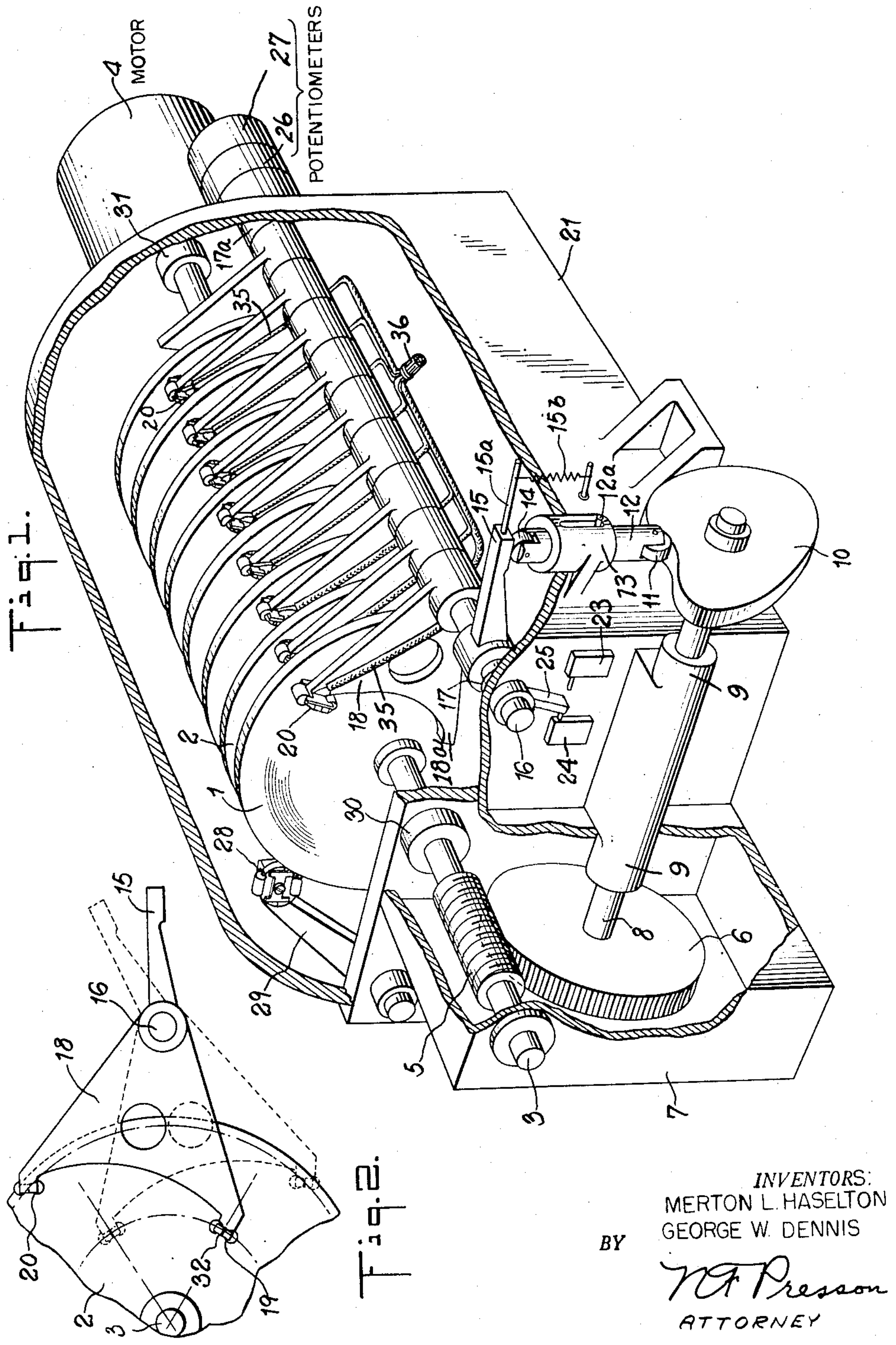
Fig. 2 is a view of a magnetic head-supporting plate in its relation to a record disk having a spiral track to be scanned.

Referring to Fig. 1, we show a plurality of flat disks 1, 2, etc. fixedly mounted for rotation on a common shaft 3 which may be driven by a motor 4. The shaft is suitably journaled at both ends. On the shaft is a worm 5 which meshes with a worm gear 6.

The worm 5 and worm gear 6 are enclosed in a gear box 7, a portion of which is shown in the drawing to be broken away in order to expose the gear structure. A worm gear shaft 8 rotates in bearings 9 and also carries a cam 10 the peripheral contour of which is designed to exercise control over mechanism for enabling rows of scanning heads to follow spiral recording tracks on the disk faces.

A cam follower roller 11 is swiveled at one end of a slide rod 12, the other end of which carries a roller 14. A cylinder 13 holds the slide rod 12 in position to maintain its endwise thrust properly. A pin 12a affixed to the rod 12 plays in a slot of the cylinder 13 and prevents turning of the slide rod on its axis.

Our scanning heads 19 and 20 are in pairs, each pair being mounted on one carrier plate 18. The several plates 18 are all swung on one rock shaft 16 which is held in ball bearings 17 and 17a.

The gang of scanning head carrier plates 18 is caused to make reciprocal excursions the oscillations of which are maintained in a fixed ratio to the revolutions of the record disks 1 and 2, and depends on the number of teeth in the worm wheel 6. Scanning operations over the spiral data record tracks are not quite co-extensive with the arcs through which the scanning heads are swung, because some allowance must be made for reversing the direction of their strokes without undue mechanical shock. Also it is desirable to move the scanning heads at a substantially constant angular velocity while they actively follow the spiral record tracks, and to accelerate and decelerate the swinging motion only when in close proximity to the points of reversal. The contour of the cam 10 is, therefore, designed to produce such constant velocity strokes during scanning periods and to obtain an approximate harmonic motion of the oscillatory transmission at the ends of each stroke. This cam design is, therefore, one in which each of the scanning heads will follow a spiral track the convolutions of the track being substantially equidistant from each other.

The motion of a cam follower roller 11 as it rides over the periphery of the cam 10 is communicated to a roller 14 at the upper end of a slide rod 12, and thence to a lever 15 which is affixed to the rock shaft 16. The lever 15 has an extension piece **15*a* for anchorage of a helical spring 15*b*, the other end of this spring being fixedly anchored in any suitable manner. The surface of lever 15 which rests on the roller 14 is held in contact therewith by the spring 15*b***.

The record disks are spaced apart along the shaft 3 suitably to accommodate the free swinging of the scanning heads 19 and 20 between the disks. The heads 19 have their magnetic pole pieces facing disks 1 and the like so as to scan spiral tracks which are on the right hand or rearward sides of these disks, as viewed in Fig. 1. The heads 20 have their magnetic pole pieces oppositely faced so as to scan tracks on the left hand side or front side of each of the disks 2 and the like. These pole pieces of the scanning heads do not touch the disks, but are accurately positioned so as to maintain a minimum of air gap for the magnetic flux paths reaching to the recording tracks on the disks.

The scanning head carrier plates 18 are suitably dimensioned so that the row of heads 19 as mounted thereon may be caused to finish scanning the innermost convolutions of the associated spiral tracks just when the heads 20 in another row are in position to start scanning the outmost convolutions of their associated spiral tracks. The scanning operations are always commenced at the outer ends of the spirals. These operations are, therefore, interrupted when the scanning heads move from inner to outer ends of the spiral tracks. The activating of the recording and playback circuits is timed so that the input and output signals will be utilized only as they are directed into or out from a particular scanning head while it is following its spiral track inwardly from the outer convolution. The gating of signals so as to utilize selected portions of any one track is a matter of conventional procedure which is not within the scope of this disclosure. It might be well, however, to describe how we prefer to generate the necessary synchronizing pulses for performing the usual gating operations.

On the periphery of disk 1 only we record a train of uniform spaced (or timed) signals. A scanning head 28 mounted on an arm 29 continuously scans this recording. Consequently pulses are fed to an amplifier (not shown) for conventional purposes of utilization. Usually there is a small gap between the start and finish ends of the sync pulse recordings which can be used to develop a start signal for the count of pulses generated within the period of each disk revolution.

During each of a predetermined number of revolutions of the record disks 1 and 2 a different one of the convolutions of the spiral tracks will be scanned. These convolutions can be counted by counting the gaps in the generated sync pulse trains at the start of each revolution of the disk 1 under the scanning head 28. An electronic counter would serve this purpose and another electronic counter would conventionally count the sync pulses cyclically generated during each disk revolution. Both these counters would preferably be of the self-restoring type so as to be operated repetitively. It is conventional, however, to utilize the gap in the sync pulse train to correct for any error of count that may occur during a single revolution of the disk. This correction would apply only to the counter for individual sync pulses. The disk revolution counter may be phased with respect to the oscillations of the scanning heads over the spiral tracks by the use of microswitches 23 and 24. These switches may be conventionally actuated by a lever 25 mounted on the rock shaft 16. Thus, when switch 23 is actuated by momentary pressure on its plunger, a disk revolution count will be started for the inward swing of heads 19 and the like while the disks make a predetermined number of revolutions. Likewise, when switch 24 is actuated momentarily, a disk revolution count will be started for the inward swing of the heads 20 and the like over their respective spiral tracks.

The micro-switches are also called upon to operate locking relays for the purpose of maintaining certain scanning head circuits part way closed throughout the scanning cycles of the alternately functioning groups of heads 19 and the like, or 20 and the like. The full closure of such circuits is an electronic gating operation which is timed to record selected pulses or to play back the same in relation to specific items of data which have their chosen places along the spiral recording tracks. It appears unnecessary to further explain these switching and gating functions since they are well known in the art and beyond the scope of our invention. What we do show as working parts of our invention is means to initiate such switching operations at times properly phased with respect to the mechanical movements of the scanning head carriers.

Figures 3, 4:
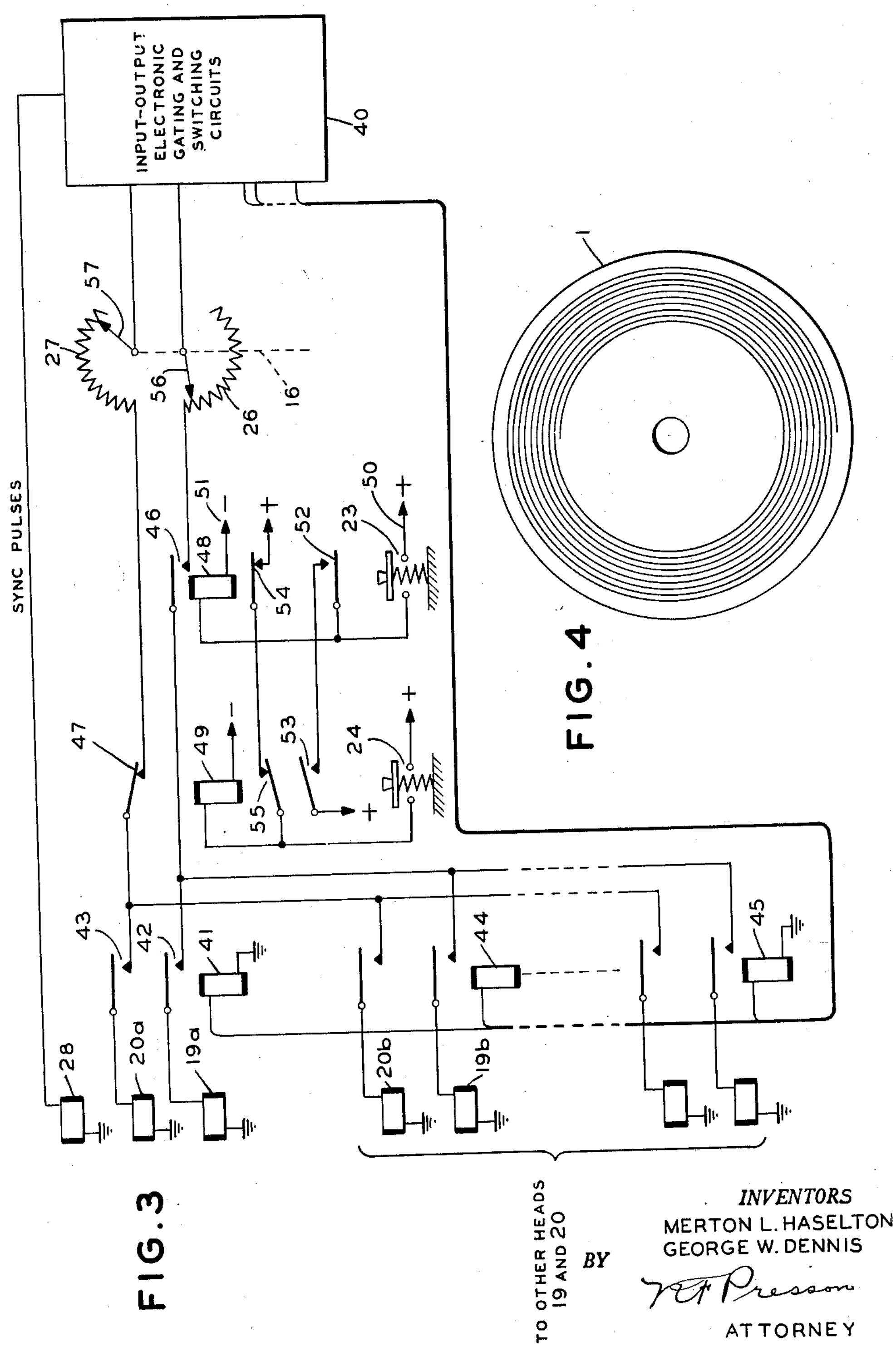
Fig. 3 shows schematically a switching circuit for connecting selected pairs of scanning heads to input-output electronic gating and switching circuits.
Fig. 4 comprises a typical trace of the recording tracks which are generated by the scanning heads as they oscillate across the surfaces of the disks.

Referring to Fig. 3, a typical arrangement of switching relays well known in the art is shown for alternately closing circuits from scanning heads 19 and 20 to the electronic switching, gating and selection circuits 40. The initial selection is accomplished under control of the input-output selection unit by the operation of one of the head selection relays such as 41, which operation closes a pair of contacts 42 and 43 thereby partially completing the operating paths to heads **19*a* and 20*a*. Other pairs of heads such as 19*b* and 20*b* remain disconnected due to open circuits at contacts of relays 44, 45**, etc.

Following the operation of relay 41, the scanning heads 19 and 20 are alternatively switched to the electronic input-output gating circuits 40 through contacts 46 and 47 of locking relays 48 and 49 which are under control of the microswitches 23 and 24, respectively; one or the other of these relays is always energized, and it will be assumed that 49 currently is energized. The operation of potentiometers 26 and 27 which are also in the scanning head circuits will be explained later.

When switch 23 closes, a circuit is completed from positive potential source 50 through the contacts of the switch and the winding of relay 48 to negative potential source 51. As relay 48 operates, its contacts 54 open the locking circuit of relay 49 through contacts 55 of that relay which releases and at its contacts 53 establishes a locking circuit through contacts 52 of the operated relay 48 to hold the latter relay operated after the switch 23 opens. Contacts 46 of relay 48 close to head **19*a* through contacts 42 of relay 41. The release of relay 49, at its contacts 47, opens the operating circuit for head 20*a*. It will be evident from the above circuit description that relays 48 and 49 operate as a complementary switching pair alternately operating from the switches 23 and 24, to connect the input-output electronic gating circuits first to one scanning head and then to the other in phase with the oscillations of the head carrier plate 18, Fig. 2. As previously stated, the final gating function is completed by electronic means under control of electronic counters operating from synchronizing scanning head 28**.

It will be apparent to those skilled in the art that the aforementioned electronic counter for counting disk revolutions can be used in combination with conventional switching means to limit the activation of the scanning head circuits to those disk revolutions in which the spiral tracks are being scanned and to utilize the periods of several disk revolutions only for slowing up, reversing and accelerating the motions of the scanning heads at the ends of the spiral tracks. Thus, if the worm wheel 6 were to have 96 teeth, for example, so as to rotate the cam 10 once during every period of 96 revolutions of the disk shaft 3, it might be found practical to restrict the scanning cycle for each spiral track to 40 revolutions, one row of scanning heads being operative while the rock shaft 16 swings one way, the other row of scanning heads being operative during another 40 revolutions of the disks while the rock shaft 16 swings the other way. Each period of 40 revolutions would be separated from the next similar period by the period of 8 revolutions of the disks.

The assumptions set forth in the preceding paragraph are only illustrative, but if they held, then the spiral track on disk 1 which is scanned by head 19 would be traversed thereby during an upward swing of the head carrier plate 18 and this traversal would comprehend 40 convolutions of the spiral. The duration of this traversal would also be concurrent with 40 revolutions of the disk and would be preceded by and followed by periods of 8 disk revolutions each during which the reciprocating members would be enabled by the action of the cam 10 to smoothly decelerate, reverse and accelerate up to the full angular velocity which is required for the scanning periods. As a refinement of design of the profile of cam 10, however, it is preferable to take into consideration the fact that the swing of the scanning heads is about the axis of the rock shaft 16 and so these heads do not approach the axis of the disks radially, thus dictating a measure of compensation of the angular velocity of the heads as they approach the inner extremities of the record tracks. A slight acceleration just before the period of deceleration is needed in order to maintain equal spacing between the convolutions of the spiral.

When the head carrier plates 18 swing downwardly the heads 20 and the like are caused to be activated and to scan the spiral tracks on the sides of the disks facing the observer of Fig. 1. During this scanning cycle the slide rod 12 is lifted by the cam action on the follower roller 11 and against the retractive effort of the spring 14. Taking the longest radius of the cam as a reference axis and when the cam 10 rotates to a position at which this longest radius extends upwardly to within 15° of a vertical axis, it is at this point of the scanning cycle in which the head 20 functions that the innermost convolution of the spiral track on the face side of disk 2 has been traversed. During the next succeeding four revolutions of the disk shaft 3 the cam follower roller 11 rides to the point of longest radius of the cam periphery. Then after four more revolutions of the disk shaft 3 the inclination of the axis of symmetry of the cam 10 is at 15° to the other side of the vertical axis and another scanning cycle for heads 19 and the like is initiated and continues for 40 disk revolutions, these heads being moved upwardly and toward the innermost convolutions of the disks.

From the foregoing description it will be apparent that we have available a source of synchronizing pulses, as generated by the scanning head 28 when it senses magnetization spots on the periphery of disk 1. We, therefore, can use these pulses to actuate conventional electronic counters, as before stated, both for counting the series of disk revolutions during a full cycle of the scanning heads as they traverse the spiral record tracks, and also for counting the digits or bits along the spiral tracks so as to locate any desired piece of information to be played back, or to record new information in its proper place for future reference. With the arrangement as shown it will be apparent that in each convolution of the spiral track the number of bits must be the same as in each other convolution for the reason that a fixed number of sync pulses is generated by each cyclic pick-up of the sync pulse scanning head 28. So the bits are more crowded in the inner convolutions than in the outer convolutions of the spiral track. The permissible "packing factor" is, therefore, determined by the linear spacing of the bits on the innermost convolution of the spiral track. The bit recordings in other convolutions of the spiral track must of necessity fall on the same radii as those of the innermost convolution because of the repetitive disk scanning of the sync track while the entire length of the spiral track is scanned for its data input or output. Despite the loosely packed bits in the outer convolutions it can be shown that at least twice as much information can be stored on the spiral tracks of disks, using both sides thereof, as on the periphery of a drum of equal diameter and of an axial length substantially equivalent to that which is required for the plurality of disks with spaces intervening to accommodate the scanning heads.

Our invention is only indirectly concerned with the electrical equipment of a magnetic memory system in operative association with which the invention itself finds utility. It is appropriate to mention, however, that the mechanical structure as herein shown and described is well suited to the performance of those functions which are naturally within its province as a means for maintaining a plurality of scanning heads suitably positioned with respect to the data recording tracks to carry out the usual operations of recording and play-back of statistical data. Furthermore, we have shown how the essential synchronizing pulses may be generated for timing all gating functions so as to activate the scanning heads selectively and with respect to wanted portions of the recording tracks where data items are to be recorded or played back.

It will be observed by those skilled in the art that during the progress of a scanning cycle over a spiral track, where the cycle begins at the outer end, and where a play-back operation is in progress, the amplitude of the pick-up signals becomes gradually diminished as the head approaches the innermost convolution of the spiral. This is caused by decreased velocity of the recording surface past the scanning position as track convolutions of smaller and smaller circumference are scanned. In order to compensate for such amplitude variation of the play-back signals we have provided two potentiometers 26 and 27 for control of the gain in each set of amplifiers, one set being operatively associated with the scanning heads 19 and the other set of amplifiers being operatively associated with the scanning heads 20. These potentiometers are so connected to the input circuits of the amplifiers as to suitably control the gain therein and in one case to increase the gain for output signals delivered by the heads 19 and the like while they are being swung upwardly toward the innermost convolution; and to increase the gain for output signals delivered by the heads 20 and the like while they are being swung downwardly toward the innermost convolution. This method of gain control is well known in the art.

Referring again to Fig. 3 the two potentiometers 26 and 27 are shown with their contact arms 56 and 57 connected to oscillating shaft 16 in such a manner that the excursions of this shaft turn the contact arms so that as one potentiometer resistance 26 is decreasing to accentuate the scanning head signals from **19*a* as this head moves inwardly toward the slower moving center of the disk, the other potentiometer 27 is restoring to its maximum resistance position preparatory to the scanning cycle of head 20*a***.

It is desirable to mount each of the scanning heads on their supporting plates 18 in such manner that the gap between their two pole pieces will be aligned with a radius of the innermost recording track convolution; that is, where the bits are most closely packed. This will be more clearly seen by reference to Fig. 2. There it is shown diagrammatically that when the head 20 has been swung to the point of scanning the innermost convolution on one side of the disk 2 the gap separating the two poles of the scanning head is aligned with the radii of the disk 2. The pole piece faces of the head in this position are delineated with full lines and the gap betwen the poles is shown as a line 32 because the gap is very thin. Because the bits are most closely packed in the innermost convolution the elongation of their magnetized spots should be on an axis which is radial. But this orientation of the pole pieces of the heads requires that when they are in position to scan the outermost convolution of the spiral track the gap between the poles will be at an angle to the disk radius in the scanning position, due to the swing of the head about the axis of the rock-shaft 16. So in the outermost convolution of the recording track the long axis of the magnetized spots is inclined with respect to the disk radius at the scanning point. The angle of inclination is commensurate with the angle subtended within the arc of swing of the scanning head holder 18 from start to finish of the spiral track scanning stroke, but exclusive of the overthrow during the eight disk revolutions prior to and following the coverage of the spiral track; that is, when deceleration, reversal and acceleration of the head swing occurs. It is of little consequence that when the outer convolutions of the spiral track are being scanned that the long axis of the magnetization spots in those convolutions should be staggered because the spots have to be spaced apart considerably more than in the inner convolutions.

In Fig. 2 the varying orientation of the pole-piece gap in the scanning heads with respect to the radial direction of the disk scanning point is shown by the broken line representation of the scanning head pole pieces positioned and oriented as they must be while scanning the outermost convolution of the spiral track. In this track the bit recordings are spaced apart sufficiently to make the inclined axis of the pole pieces of no consequence.

It will be appreciated that the first carrier plate 18 seen in Fig. 1 does not have a recording and reproducing head 19 on the lower portion 18a thereof since this carrier plate coacts only with disk 1, but that each of the carrier plates 18 which is intermediate a pair of disks 1, 2, etc., carries a recording and reproducing head 19 and 20. Each head 20 coacts with the adjacent face of a disk immediately to the right of the head, whereas each recording and reproducing head 19 coacts with the adjacent face of a disk immediately to the left of the head, as viewed in the figure. The various transducer units 19 and 20 each is connected in a recording and reproducing circuit by means of a twin conductor cable, such as the cables 35 seen in the figure, and for convenience these twin conductor cables are grouped into a larger cable 36.

It will be understood that our invention is capable of modification in various ways as to structure and as to mode of operation, but without departing from the spirit and scope of the invention itself. It is not intended, therefore, that the scope of the claims should be limited to the illustrative form of the invention as shown.

What is claimed is:

1. Magnetic signal storage apparatus comprising a record scanning device including a row of rotatable disks having side surface coatings of magnetizable material, a common shaft on which said disks are mounted for continuous rotation at a predetermined revolution rate, a plurality of magnetic heads, a source of synchronizing pulses for timing the recording or readout of pulses by said heads, the frequency of said synchronizing pulses being determined by the revolution rate of said disks, a mounting device for said heads having transverse members jointly movable through a predetermined arc on a common axle exterior to the peripheries of said disks, said transverse members having portions thereof extending between adjacent ones of the disks and carrying said heads for scanning the sides of said disks, the movement being such as to maintain a suitable scanning relation between each head and the disk surface to be scanned, and gear mechanism mechanically intercoupling said shaft and said axle and arranged to produce reciprocable rocking movement of said transverse members, thereby to cause said heads to scan spiral paths on the rotating disks.

2. The combination according to claim 1 and including in said gear mechanism a worm on said shaft, a worm wheel and spindle therefor, a cam mounted on said spindle and rotatable with said worm wheel, and a cam follower of slide rod type for producing the reciprocable rocking movement of said transverse members.

3. The combination according ot claim 2 and including in said gear mechanism a lever affixed to said axle for the transverse members and movable therewith, this lever being suitably disposed for actuation by said cam follower, and spring means for maintaining said cam follower in contact with the periphery of the cam.

4. Magnetic signal storage apparatus comprising a multiple head scanning device for magnetic disks having a plurality of coaxially mounted and rotatable disks having recording surface coatings of magnetizable material on the sides thereof, mean for rotating said discs at a predetermined revolution rate, an oscillatory support for the heads of said scanning device, said support comprising rotor vanes each interleaved between the sides of adjacent ones of said disks, each vane having usually two heads mounted thereon and arranged to maintain its heads in scanning relation to the record surfaces of the sides of the two adjacent disks which flank the same, a source of synchronizing pulses for timing the recording or readout of pulses by said heads, the frequency of said synchronizing pulses being determined by the revolution rate of said disks, and transmission means for oscillating said vanes as a gang and for causing said heads to scan spiral tracks on said disks.

5. Apparatus according to claim 4 wherein said transmission means includes a reducing gear and a cam-and-follower motion arranged and adapted to swing said heads reciprocally and with such variations of angular velocity as will cause the heads to follow the spiral track convolutions, these convolutions being spaced apart by substantially equal radial distances.

6. Apparatus according to claim 4 wherein said scanning heads are of a type having two pole pieces facing the disk record surface to be scanned, these pole pieces being separated by a linear gap which extends transverse to the spiral record track and is substantially perpendicular to the record track when scanning the innermost convolution of the spiral to cause said gap to be substantially aligned with a radius of the innermost convolution where the signals are more closely packed.

7. In a multiple head scanning device for a magnetic memory, a plurality of scanning heads, a plurality of magnetically coated disks the sides of which have recording tracks of spiral configuration for storing signals, means including a spindle on which said disks are fixedly mounted with intervening spaces for rotating the disks at a predetermined revolution rate, a source of synchronizing pulses for timing the recording or readout of pulses by said heads in relation to the revolution rate of said disks, a rock shaft supported in bearings and held parallel to said spindle, a plurality of scanning head holders fixedly mounted on said rock shaft and arranged to carry said scanning heads and to swing the same within said intervening spaces, also to maintain each of said heads with its pole pieces in close proximity to an opposed face of an associated one of said disks, and means including gear mechanism for oscillating said rock shaft at a rate bearing a fixed low ratio with respect to the revolution rate of said spindle, thereby to cause a row of said heads to follow spiral tracks on said disks.

8. The combination according to claim 7 and including in said gear mechanism a worm and worm gear transmission.

9. The combination according to claim 8 and including a cam and cam follower mechanism arranged and adapted to translate the rotation of said worm wheel into a reciprocating movement of said rock shaft.

10. The combination according to claim 7, wherein said scanning head holders constitute means for holding two scanning heads in such positions that one while presenting its pole pieces to the outer end of a spiral track on one disk, at the same time enables the other head to present its pole pieces to the inner end of a spiral track on a different disk.

11. In a multiple head scanning device for a magnetic memory, a plurality of scanning heads having a unitary supporting frame composed of arms mounted on a common rock shaft, a plurality of magnetically coated disks the sides of which have recording tracks of spiral configuration for storing signal pulses, means for rotating said disks at a predetermined revolution rate, a constantly rotatable spindle on which said disks are fixedly mounted and so spaced apart as to accommodate scanning heads and the arms of said supporting frame, a source of synchronizing pulses for timing the recording or readout of said signal pulses by said heads, the frequency of said synchronizing pulses being determined by the revolution rate of said disks, and means including gear mechanism mechanically translating the revolutions of said spindle into oscillations of said rock shaft at a relatively low cyclic rate with respect to the spindle revolutions, whereby said scanning heads are caused to scan said spiral recording tracks on said disks.

12. The combination according to claim 11 wherein said supporting frame is constituted as means for holding certain of said scanning heads in position to start a scanning cycle inwardly over the spiral tracks of disks which they respectively face, and at the same time for holding others of said scanning heads in position to start a return stroke from the inner ends of the spiral tracks which they would then have finished scanning.

13. The combination according to claim 11, in which said source of synchronizing pulses includes a synchronizing pulse generator of the type having a spot-magnetized track to be scanned repeatedly, each cycle of scanning being concurrent with the scanning of a different one of a succession of convolutions of any of said spiral tracks.

14. The combination according to claim 11, and including switching means under control of said rocks shaft for causing the activation of said scanning heads only while they are being swung from the outer ends of the spiral tracks through successive convolutions thereof to their inner heads and at instants determined by the synchronizing pulses.

15. The combination according to claim 11 and including potentiometric gain-control means under control of said rock shaft for rendering the amplified output from said scanning heads substantially constant despite variations of signal energy collected by said heads as their scanning points are traversed by spiral track convolutions of gradually diminishing radii.

16. The combination according to claim 11 and including structure in the arms of said unitary supporting frame whereby said scanning heads, the pole pieces of which are separated by a thin gap transverse to the scanning direction, are so aimed when scanning the innermost convolution of the spiral track where the signals are more closely packed as to present the gap to a scanning point of said track in parallel relation to the radius of that point, and to present that gap to scanning points of larger convolutions with increasing angles of inclination to the radii of the scanning points.

References Cited in the file of this patent

UNITED STATES PATENTS

| | | |
|---|---|---|
| 2,229,293 | Huntley et al. | Jan. 21, 1941 |
| 2,564,403 | May | Aug. 14, 1951 |
| 2,690,913 | Rabinow | Oct. 5, 1954 |

OTHER REFERENCES

Publication, Electrical Engineering, Aug. 1952 pp. 745–749.